(12) United States Patent
Balsells Mercade et al.

(10) Patent No.: US 11,845,611 B2
(45) Date of Patent: Dec. 19, 2023

(54) BRISTLE BRUSH AND CONVEYOR BELT FORMED BY A PLURALITY OF SAID BRISTLE BRUSHES

(71) Applicant: OPEN MIND VENTURES, S.L.U., Igualada (ES)

(72) Inventors: Antoni Balsells Mercade, Igualada (ES); Josep Mª Carrer Vives, Igualada (ES); Bernat Balsells Vives, Igualada (ES); Santiago Lucas Serra, Igualada (ES)

(73) Assignee: OPEN MIND VENTURES, S.L.U., Barcelona (ES)

( * ) Notice: Subject to any disclaimer, the term of this patent is extended or adjusted under 35 U.S.C. 154(b) by 0 days.

(21) Appl. No.: 17/610,781

(22) PCT Filed: May 12, 2020

(86) PCT No.: PCT/EP2020/063158
§ 371 (c)(1),
(2) Date: Nov. 12, 2021

(87) PCT Pub. No.: WO2020/229454
PCT Pub. Date: Nov. 19, 2020

(65) Prior Publication Data
US 2022/0306391 A1 Sep. 29, 2022

(30) Foreign Application Priority Data

May 13, 2019 (EP) .................................... 19382370

(51) Int. Cl.
*B65G 15/42* (2006.01)
*B65G 15/58* (2006.01)
(Continued)

(52) U.S. Cl.
CPC ............. *B65G 15/42* (2013.01); *B65G 15/58* (2013.01); *B26D 7/20* (2013.01); *B26D 7/32* (2013.01)

(58) Field of Classification Search
CPC .......... B65G 15/42; B65G 15/44; B26D 7/20; B26D 7/32
See application file for complete search history.

(56) References Cited

U.S. PATENT DOCUMENTS 4,328,726 A 5/1982 Pearl
4,476,756 A * 10/1984 Pearl ........................ B26D 7/20
83/451

(Continued)

FOREIGN PATENT DOCUMENTS

EP 2656987 A1 10/2013

OTHER PUBLICATIONS

International Search Report for PCT/EP2020/063158, dated Jul. 31, 2020, 5 pgs.

*Primary Examiner* — Mark A Deuble
(74) *Attorney, Agent, or Firm* — Danielson Legal LLC (57) ABSTRACT

The bristle brush comprises a support plate (1), a plurality of flexible bristles (2) emerging from one of the surfaces thereof, the ends of the bristles (2) furthest from the support plate (1) defining a support surface intended to receive a part to be transported and/or cut, wherein said support plate (1) comprises a leading edge (11) and a trailing edge (12), said leading (11) and trailing (12) edges comprising complementary shapes. It enables a conveyor belt formed by said brushes to achieve very small turning radii.

13 Claims, 8 Drawing Sheets

(51) Int. Cl.
*B26D 7/20* (2006.01)
*B26D 7/32* (2006.01)

(56) References Cited

U.S. PATENT DOCUMENTS

| | | | | |
|---|---|---|---|---|
| 4,685,363 | A | * | 8/1987 | Gerber .................... B26D 7/015 |
| | | | | 269/53 |
| 5,125,504 | A | | 6/1992 | Corlett |
| 5,189,936 | A | * | 3/1993 | Gerber .................... B26D 7/20 |
| | | | | 83/451 |
| 5,596,917 | A | * | 1/1997 | Gerber ............... B65G 21/2036 |
| | | | | 198/689.1 |
| 6,561,344 | B1 | * | 5/2003 | Basse ........................ F16G 1/28 |
| | | | | 198/840 |
| 7,344,020 | B2 | * | 3/2008 | Grywacheski ......... A01D 61/02 |
| | | | | 198/844.2 |
| 7,594,574 | B2 | * | 9/2009 | Mol ........................ F16G 1/14 |
| | | | | 198/844.2 |
| 9,156,618 | B2 | * | 10/2015 | Balsells Mercadé .... B26D 7/20 |
| 9,731,902 | B2 | * | 8/2017 | Balsells Mercadé .... B26D 7/20 |
| 2007/0235292 | A1 | * | 10/2007 | Messenger ............. B65G 15/42 |
| | | | | 198/818 |

* cited by examiner

BRISTLE BRUSH AND CONVEYOR BELT FORMED BY A PLURALITY OF SAID BRISTLE BRUSHES

CROSS REFERENCE TO RELATED APPLICATIONS

The present application is the U.S. national phase application of, and claims the benefit of and priority to, International (PCT) Patent Appl. No. PCT/EP2020/063158, filed internationally on May 12, 2020, the entire disclosure of which is incorporated by reference as if set forth in its entirety herein.

The present invention relates to a bristle brush, which is modular and enables forming, by joining a plurality of said brushes, a homogeneous base, such as an endless conveyor belt.

BACKGROUND OF THE INVENTION

Brushes are currently known which, when duly fixed to a set of mechanical elements, form a movable surface by way of an endless conveyor belt.

Said conveyor belts are used in different industrial areas to transport and/or handle elements which must be elevated, or which cannot be in contact with a rigid or continuous surface.

There are brushes comprising a plurality of bristles mechanically fixed to a support plate and multiple brushes are linked to form a larger surface or conveyor belt.

This system has several drawbacks, such as the manufacturing cost (fixing the bristles to a support plate), the weight (said support plate must be thick in order to properly fix the bristles), the power required to move the conveyor belt (the greater the weight, the higher the power required), etc.

An example of this type of brushes is described in EP 2 656 987 A1, which describes a plastic, modular and self-engaging bristle brush, comprising a set of runners including a pair of opposite guiding and self-centring ends which project from the perimeter of the brush, said runners being distributed so that the ends of contiguous brush runners are able to fit together by overlapping each other.

In addition, said runners include at their guiding and self-centring ends articulated joining means between contiguous brushes for the self-engaging thereof, converting the set of multiple brushes into a cutting base, leaving the material above it, enabling its handling, cutting, die-cutting, etc., which in turn forms an endless conveyor belt.

The bristle modules, preferably injected, moulded or printed in 3D, are manufactured in different materials with different hardnesses for different applications, either cutting, handling or transport on an endless belt.

Initially the materials of the bristle brushes were relatively rigid plastics, and a specific turning radius was necessary to rotate the conveyor belt, generally greater than 150 mm. For some cutting and subsequent handling applications, highly flexible materials were chosen, the handling being easier and more pleasant, and at the same time allowing very low turning radii, from 30 mm, due to the bending of the base.

The design described in this document has the drawback that, when joining the modules by a single axis, said axis must withstand all the stresses, so it creates micro-separations between modules in the forward direction of the belt, which, although they do not generally affect the operations, they can be improved from the standpoint of durability and aesthetics.

Therefore, an object of the present invention is to provide a bristle brush that is very flexible, allowing a conveyor belt to achieve very small turning radii.

DESCRIPTION OF THE INVENTION

The mentioned drawbacks are resolved with the bristle brush of the invention, while presenting other advantages which will be described below.

The bristle brush according to the present invention comprises a support plate, a plurality of flexible bristles emerging from one of the surfaces thereof, and said support plate comprising coupling elements, the ends of the bristles furthest from the support plate defining a support surface intended to receive a part to be transported and/or cut or handled, wherein said support plate comprises a leading edge and a trailing edge, said leading and trailing edges comprising complementary shapes, for example, complementary recesses and projections, or a polygonal shape, for example, hexagonal, which enables a plurality of brushes to be assembled in a staggered or interspersed manner.

The geometry of the bristle brush, as described above, enables a homogeneous transition to be obtained when passing over a gear or roller during its movement forming a conveyor belt, especially in the change of direction at the end of said conveyor belt, since the flexible materials tend to yield slightly in the shaft area, creating micro-separations between the brushes.

In addition, in the bristle brush, said support plate also comprises coupling elements.

According to a first embodiment, said coupling elements are anchors provided with a longitudinal hole. This longitudinal hole is for placing a tie and traction rod.

Preferably, said anchors are associated in pairs, the longitudinal holes of the anchors defining two longitudinal axes on the leading edge and two longitudinal axes on the trailing edge, each for corresponding traction rods.

In this way, a visual transition on the change of direction shaft is achieved which is much more homogeneous and has no micro-separations, and a much better distribution of tensile stress is also achieved by being divided between the two traction rods inserted longitudinally in each joining area, between the brushes.

According to an alternative embodiment, the brush can have a polygonal shape with any number of faces, not necessarily quadrangular. In the case of using a hexagonal shape, the brush has an equidistant regular distribution of the traction shafts.

Furthermore, according to one embodiment, said support plate comprises a plurality of notches in the surface opposite the flexible bristles.

According to a second embodiment, said coupling elements are flanges that fit in complementary housings.

According to this embodiment, said flanges are preferably placed in the projections of the support plate and said housings are placed in the recesses of the support plate.

Furthermore, according to this embodiment, said support plate is smooth on its surface opposite the flexible bristles, said opposite surface comprising an adhesive substrate.

This smooth support plate can be used, in particular, when the end of the conveyor belt is a cylinder without steps or pull notches, generally used in belts that do not need precise positioning and that move at a higher speed.

It can also be a system that enables traction fitting or adapting to specific or standard modules of the industry, in this case using the standardised pull pinions if necessary.

Preferably, said adhesive substrate is coated with a protective sheet before its first use, which is removed to fix the support plate.

According to a preferred embodiment, each projection of the leading and trailing edge of the support plate is formed by a straight central portion and two straight side portions, arranged perpendicularly or at any other oblique angle.

According to a second aspect, the present invention also relates to a conveyor belt formed by a plurality of bristle brushes as described above, the brushes being joined in a staggered manner thanks to the complementary shapes of the leading and trailing edges.

In these different embodiments, the lower surface of the support plate of the bristle brushes seeks to adapt the conventional belts made of laminar material so that they have a surface of bristles that enables robotic systems to be used and also be incorporated in static work and handling surfaces to enable productivity to be increased in activities that require the lower handling of the elements or materials (cutting, die-cutting, linear objects, organic materials, compact and low-rise flat elements, etc.), and also in activities in which the collection must be fast and preferably lower, since it avoids the physical contact of the hand with the rigid or robotised surface of the support.

The advantage of using bristle brushes as a material transporting surface, instead of a smooth belt, lies in the fact that the materials deposited thereupon are virtually floating, enabling handling that could not be done before with automation or robots, or had to be done with clamps or complex designs, since the tools of the handler or robot can penetrate the bristles and access the part from the lower part thereof.

This functionality significantly simplifies the design of the robot clamps, enabling "gravital picking", without the need for a vacuum or sophisticated actions. It also enables multiple collection ("multipicking"), reducing the movements of the robot by being able to transport in one same movement different objects or different amounts.

In turn, this design is very useful for collaborative works, combined work carried out by robots and cobots (collaborative robots) and people. For this purpose and to make pleasant work possible, the design of the bristle has been perfected, ending with a hemispherical or conical surface, offering a more comfortable interaction with the hand of the operator or of the robot, and enabling a more secure entry of the tools that can be used, such as blades, drills or dies.

This enables a smooth entry of the hand and improves the durability in the cutting and handling processes by enabling a progressive penetration, that is smoother and with less collision, of the mechanical elements, either cutting such as blades or of another nature such as clamps or attachments of the robots/cobots.

In certain cases, the modules can be injected into one or more materials to combine their properties. In this way, a bristle brush can be injected combining a harder and more resistant polymer for the area of the anchors, to improve its mechanical performance, with a softer and smoother polymer in the rest of the base and the bristles, to offer better bending of the base in the turn and a more pleasant touch on the bristles. These injected modules are very useful given their simplicity, versatility and their economic cost compared to alternative solutions.

BRIEF DESCRIPTION OF THE DRAWINGS

To better understand what has been set forth, several drawings are attached in which a practical embodiment is schematically depicted merely by way of non-limiting example.

DESCRIPTION OF PREFERRED EMBODIMENTS

In FIGS. 1 to 4 a first embodiment of a bristle brush according to the present invention is shown, comprising a support plate 1 from which a plurality of flexible bristles 2 extends, in particular, extending from an upper surface of said support plate 1.

Said support plate 1 defines four edges, a leading edge 11, a trailing edge 12 and two side edges 13. Said leading 11 and trailing 12 edges comprise complementary recesses and projections, said projections having, for example, a trapezoidal shape, defining a straight central portion and two side portions also straight, at an oblique angle.

Said support plate 1 further comprises coupling elements, which in this embodiment are anchors 3, each of which comprises a longitudinal hole for placing a traction rod.

Said anchors 3 are associated in pairs, so that they define two longitudinal shafts for corresponding traction rods. Two of these traction rods, which are not shown in the figures, are placed on the leading edge 11 and two traction rods are placed on the trailing edge 12.

Said anchors 3 are preferably, but not necessarily, made of a material that is harder than the support plate 1 and the flexible bristles 2, for example, of a harder polymer. This feature is intended to be shown in FIG. 4 by making the anchors 3 darker than the support plate 1 and the flexible bristles 2.

Figure 4:
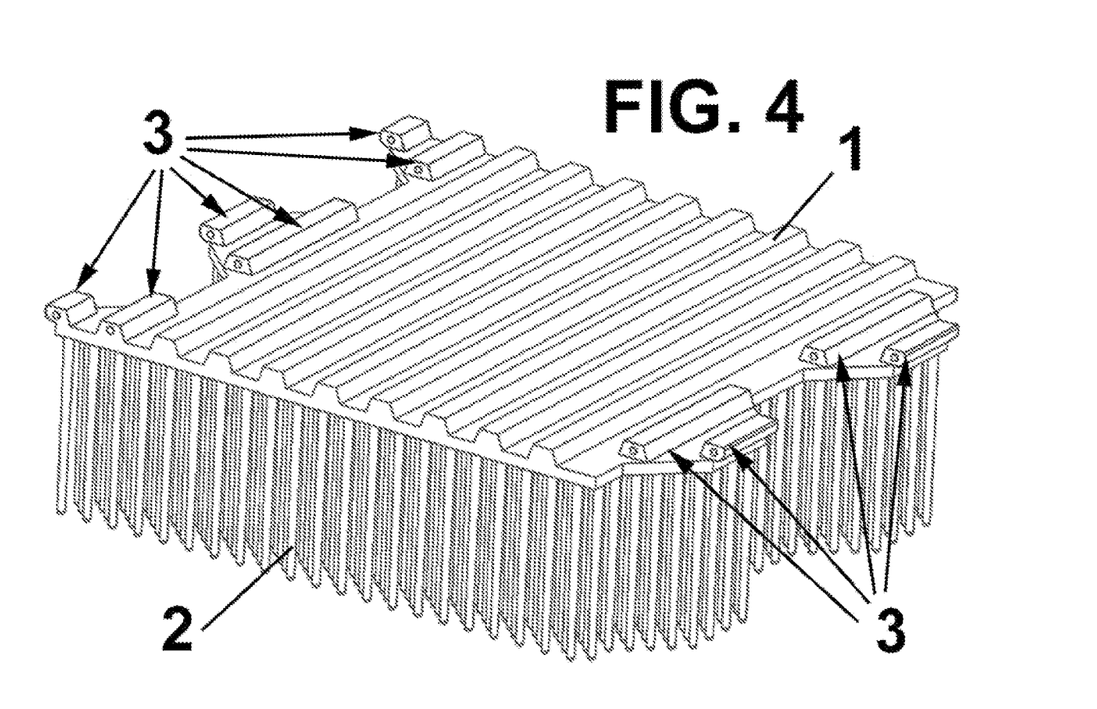
FIG. 4 is a lower perspective view of the bristle brush shown in FIGS. 1 to 3.

Said supporting plate 1 comprises a plurality of notches 14 on the lower surface thereof to enable traction thereof by means of gears (not shown), when a plurality of brushes according to the present invention is used as a conveyor belt.

Figure 1:
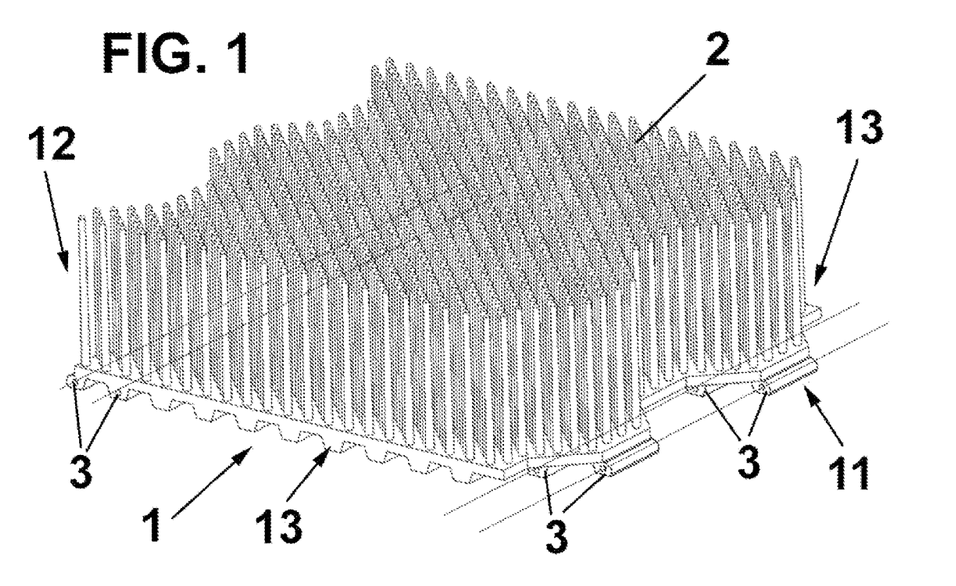
FIG. 1 is an upper perspective view of a bristle brush according to the present invention, according to a first embodiment.
Figure 2:
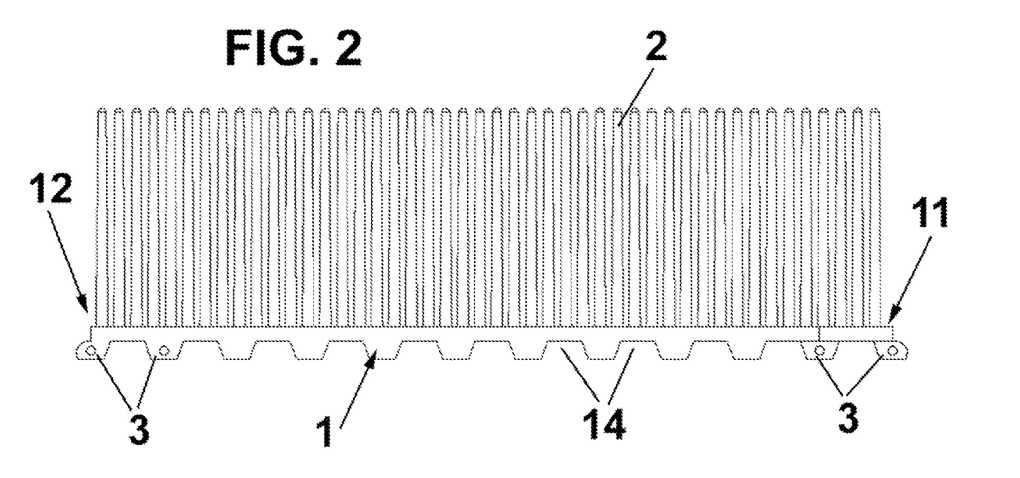
FIG. 2 is a side elevation view of the bristle brush shown in FIG. 1.
Figure 3:
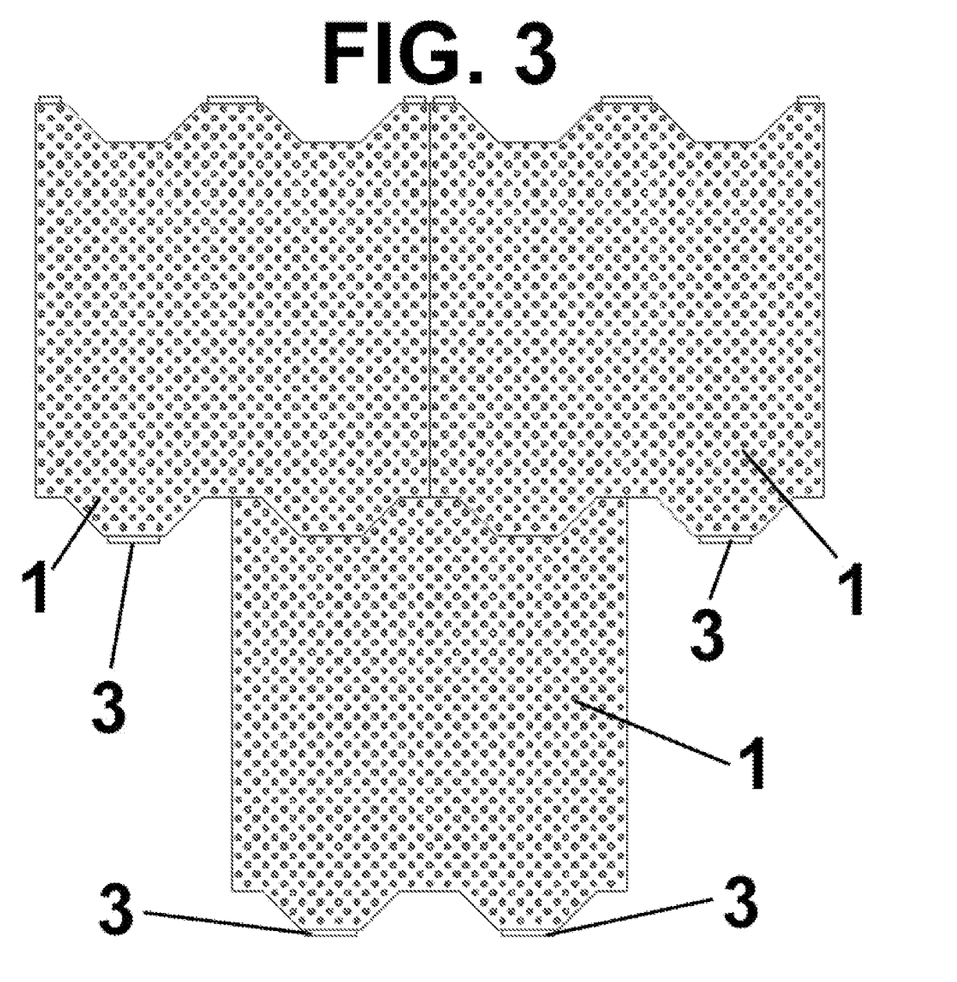
FIG. 3 is a plan view of three bristle brushes shown in FIGS. 1 and 2 joined to each other.

FIG. 3 shows how several brushes are assembled according to the present invention by means of the complementary recesses and projections, the brushes being assembled in an interspersed or staggered manner.

Figure 5:
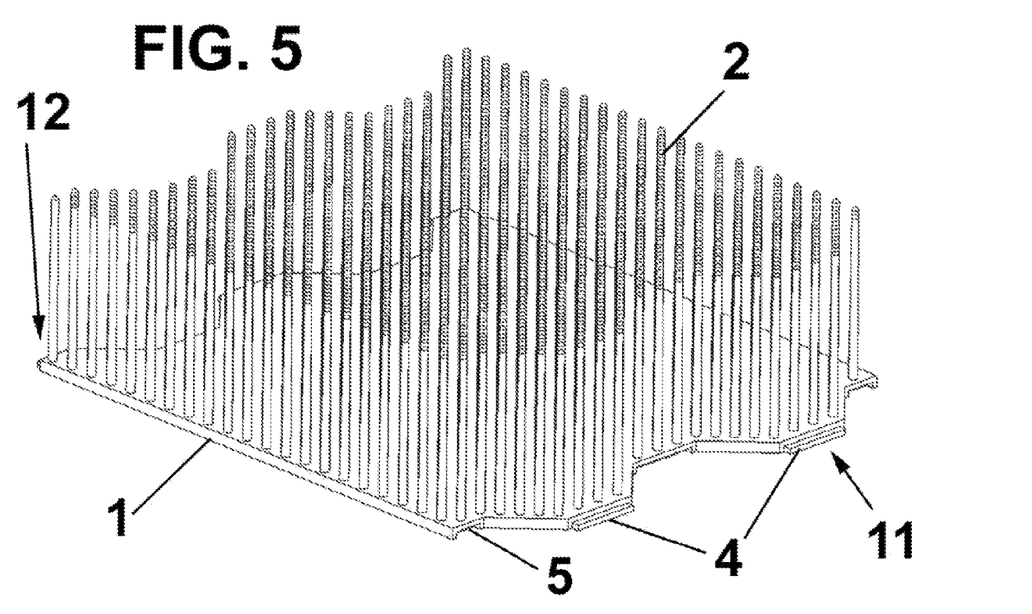
FIG. 5 is an upper perspective view of the bristle brush according to the present invention in a second embodiment.
Figure 6:
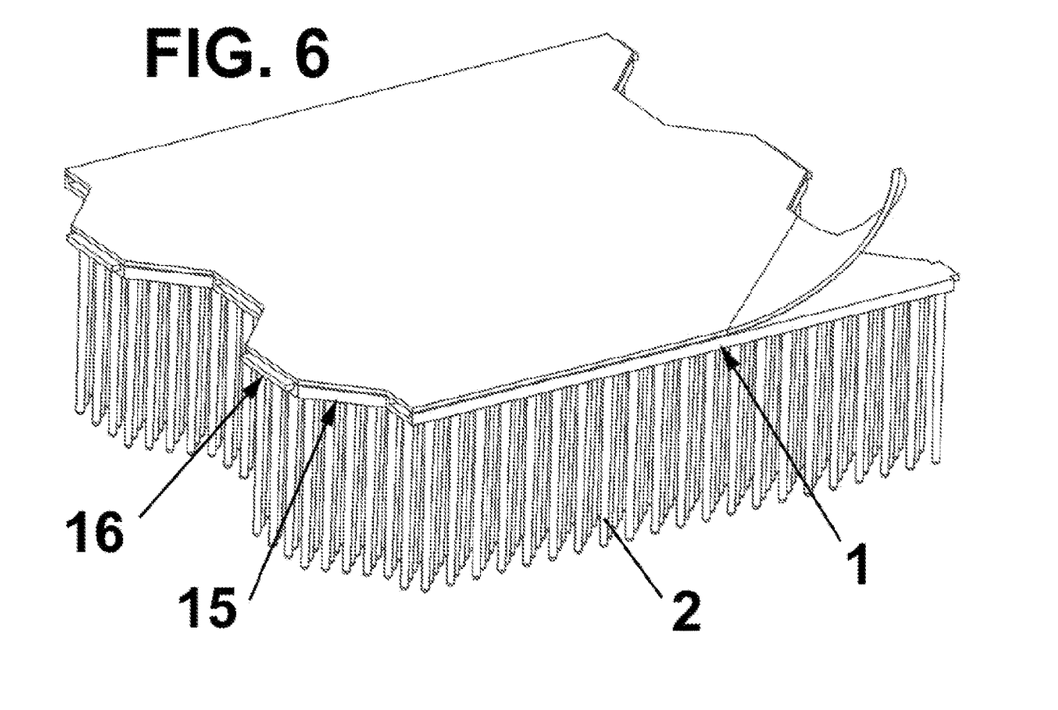
FIG. 6 is a lower perspective view of the bristle brush shown in FIG. 5.

FIGS. 5 and 6 show a second embodiment of the bristle brush according to the present invention.

For reasons of simplicity, in this second embodiment the features in common with the first embodiment are not described, and the same reference numbers are used to indicate the same or similar elements.

This second embodiment differs from the first embodiment in that the support plate is smooth on the lower surface thereof and comprises an adhesive substrate 15, which before being fixed to a surface is coated by a protective sheet 16.

Furthermore, in this second embodiment, the coupling elements are flanges 4 which are housed in complementary housings 5. As can be seen in FIGS. 5 and 6, said flanges 4 are preferably placed in the projections, while the housings 5 are preferably placed in the recesses.

Figure 7:
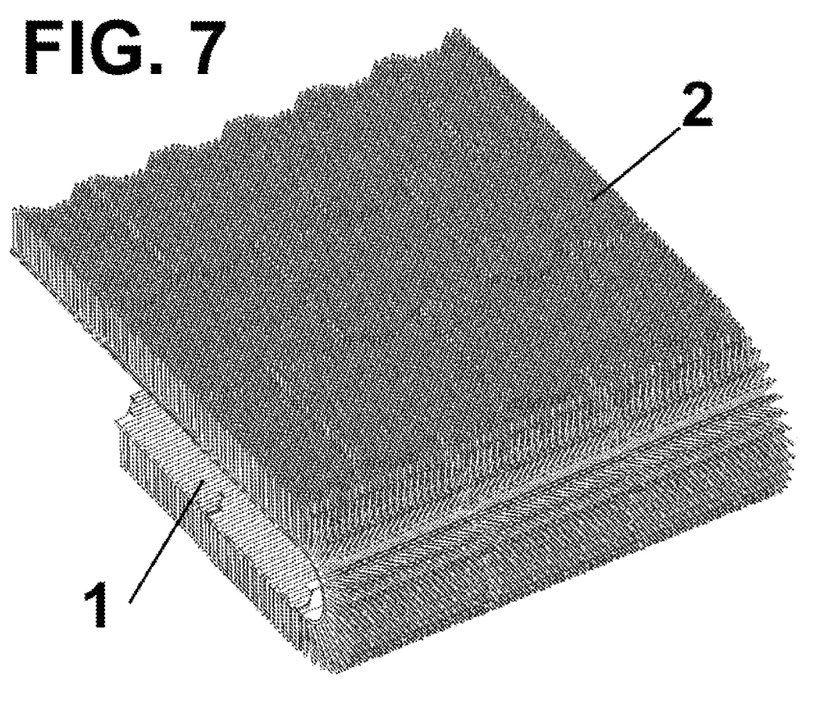
FIG. 7 is a perspective view of a conveyor belt formed by bristle brushes according to the present invention.

FIG. 7 shows a part of a conveyor belt according to a present invention formed by a plurality of bristle brushes, where it is shown that small turning radii can be achieved thanks to the flexibility of the brush material, in particular, of the support plate 1.

Figure 8:
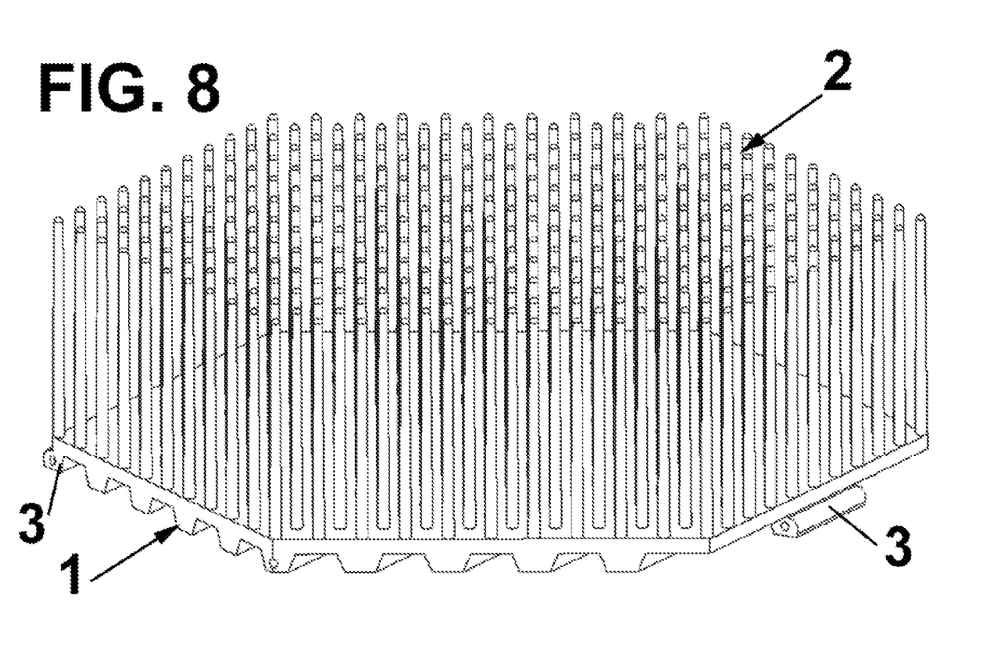
FIG. 8 is an upper perspective view of a bristle brush according to the present invention, according to an alternative embodiment.
Figure 9:
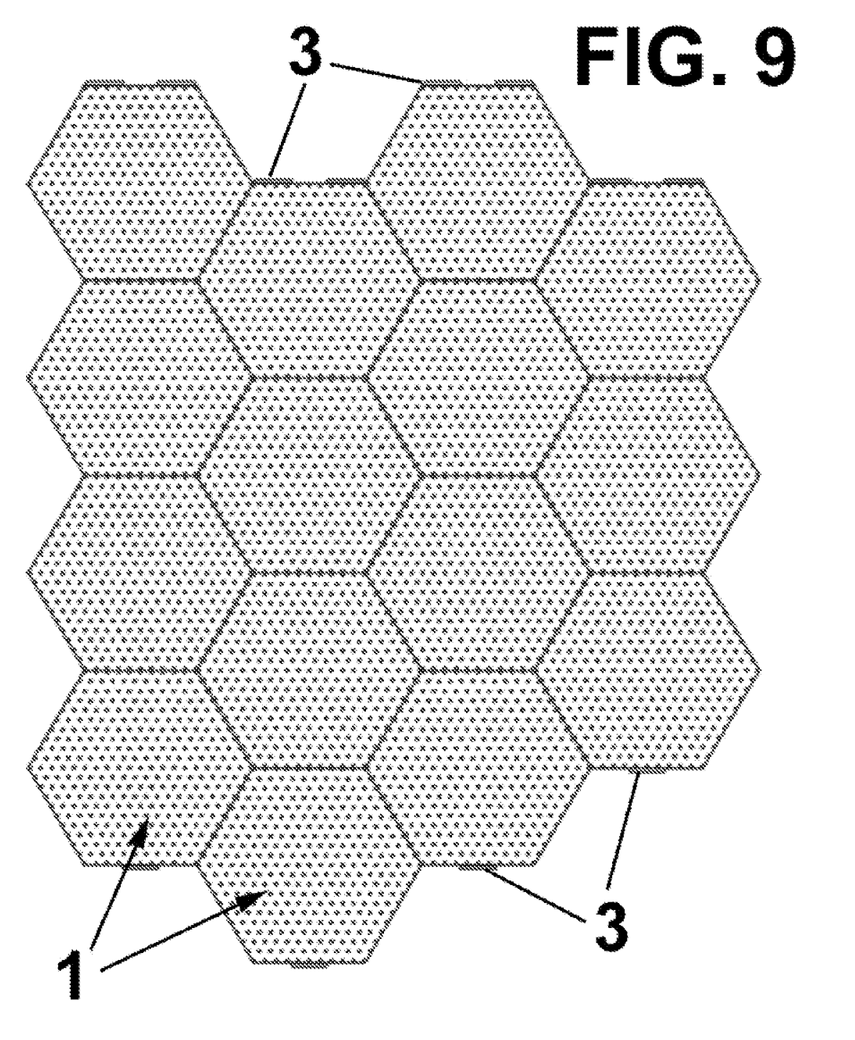
FIG. 9 is a plan view of a plurality of bristle brushes shown in FIG. 8 joined to each other.
Figure 10:
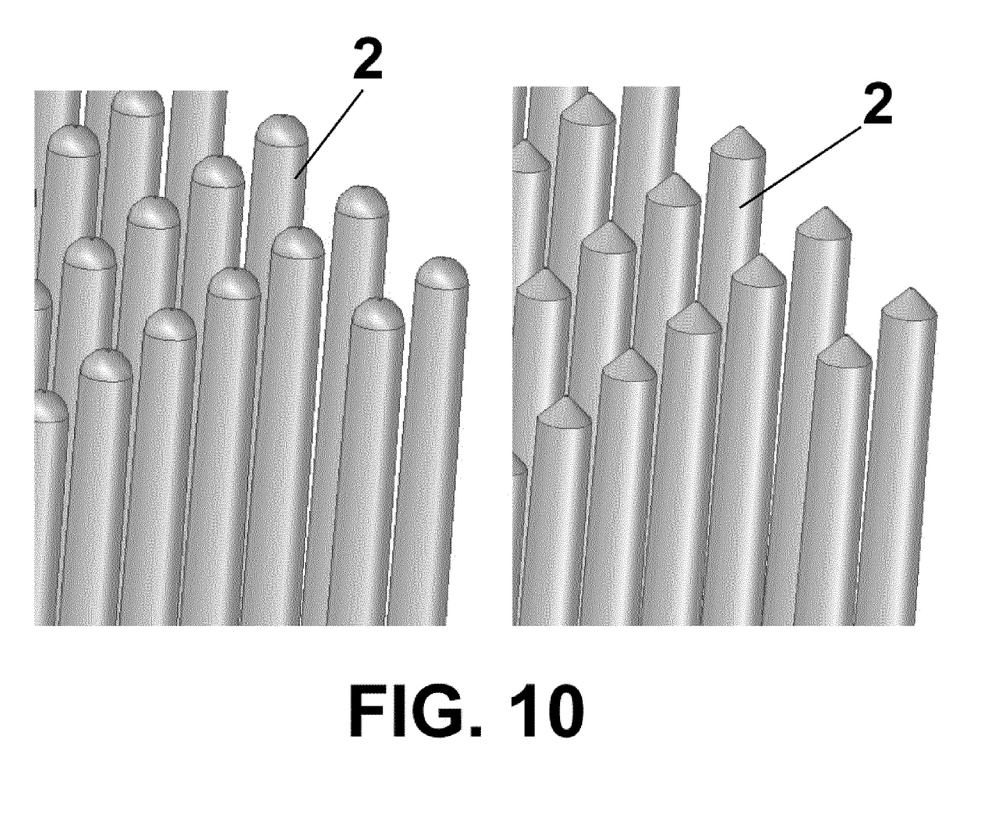
FIG. 10 is an upper detailed view of the bristle brush according to the present invention.

In FIGS. 8 and 9, a third embodiment of the bristle brush according to the present invention is shown.

In this third embodiment, said support plate 1 has a hexagonal shape, a plurality of staggered brushes being mounted (FIG. 9), for example, by an anchor 3 on the leading edge 11 thereof and two anchors 3 on the trailing edge 12 thereof.

Despite the fact that reference has been made to a specific embodiment of the invention, it is evident for the person skilled in the art that numerous variations and changes may be made to the bristle brush described, and that all the aforementioned details may be substituted by other technically equivalent ones, without detracting from the scope of protection defined by the attached claims.

The invention claimed is:

1. A bristle brush, comprising:
    a support plate (1), a plurality of flexible bristles (2) emerging from one of the surfaces thereof, the ends of the bristles (2) furthest from the support plate (1) defining a support surface intended to receive a part to be transported and/or cut, wherein said support plate (1) is smooth on its surface opposite the flexible bristles (2), said opposite surface comprising an adhesive substrate (15),
    characterised in that said support plate (1) comprises a leading edge (11) and a trailing edge (12), said leading (11) and trailing (12) edges defining complementary shapes.

2. The bristle brush according to claim 1, wherein said support plate (1) comprises coupling elements (3, 4).

3. The bristle brush according to claim 2, wherein said coupling elements are anchors (3) provided with a longitudinal hole or flanges (4) that fit in complementary housings (5).

4. The bristle brush according to claim 3, wherein said anchors (3) are associated in pairs, the longitudinal holes of the anchors defining two longitudinal shafts on the leading edge (11) and two longitudinal shafts on the trailing edge (12).

5. The bristle brush according to claim 1, wherein said support plate (1) comprises a plurality of notches (14) on the surface opposite the flexible bristles (2).

6. The bristle brush according to claim 3, wherein the support plate (1) includes a plurality of projections and a plurality of recesses, wherein said flanges (4) are placed in the projections of the support plate (1) and said housings (5) are placed in the recesses of the support plate (1).

7. The bristle brush according to claim 1, wherein the upper surface of the plurality of flexible bristles (2) is a hemispherical or conical surface.

8. The bristle brush according to claim 1, wherein said adhesive substrate (15) is coated with a protective sheet (16) before its first use.

9. The bristle brush according to claim 1, which is made up of a single piece.

10. The bristle brush according to claim 1, which is made of a polymer.

11. The bristle brush according to claim 3, wherein said anchors (3) are made of a material that is harder than the material of the support plate (1) and the flexible bristles (2).

12. The bristle brush according to claim 1, wherein the leading edge (11) and the trailing edge (12) include a plurality of projections, and each projection of the leading edge (11) and trailing edge (12) of the support plate (1) is formed by a straight central portion and two straight side portions, at an oblique angle.

13. A conveyor belt formed by a plurality of bristle brushes according to claim 1, said brushes being joined in a staggered manner.

* * * * *